United States Patent [19]

Michoud et al.

[11] Patent Number: 5,014,042
[45] Date of Patent: May 7, 1991

[54] ICE DETECTOR, ESPECIALLY FOR AIRCRAFT

[75] Inventors: Vincent Michoud; Gérard Beigbeder, both of Paris, France

[73] Assignee: Thomson CSF, Paris, France

[21] Appl. No.: 515,874

[22] Filed: Apr. 27, 1990

[30] Foreign Application Priority Data

Apr. 28, 1989 [FR] France ................... 89 05675

[51] Int. Cl.[5] ............................................ G08B 21/00
[52] U.S. Cl. .............................. 340/583; 244/134 F; 340/962
[58] Field of Search ....................... 340/583, 580, 962; 244/134 F

[56] References Cited

U.S. PATENT DOCUMENTS 4,766,369  8/1988  Weinstein ........................ 340/580
4,782,331  11/1988  Martens ........................... 340/583
4,803,470  2/1989  Fineman ........................... 340/583
4,851,817  7/1989  Brossia et al. .................... 340/583

Primary Examiner—Glen R. Swann, III
Attorney, Agent, or Firm—Cushman, Darby & Cushman

[57] ABSTRACT

A source sends light towards a receiver through an optical channel, a part of which has an interface with the external environment. The light that reaches this interface is reflected towards the receiver when the external environment is in contact with air and is refracted towards the external environment in the presence of water or ice. In streaming down the interface, the rain creates a modulation, not created by ice, in the signal of the receiver. The circuits downline of the receiver search for this modulation to determine whether the modifications of the signal of the receiver are due to rain or to ice.

4 Claims, 3 Drawing Sheets

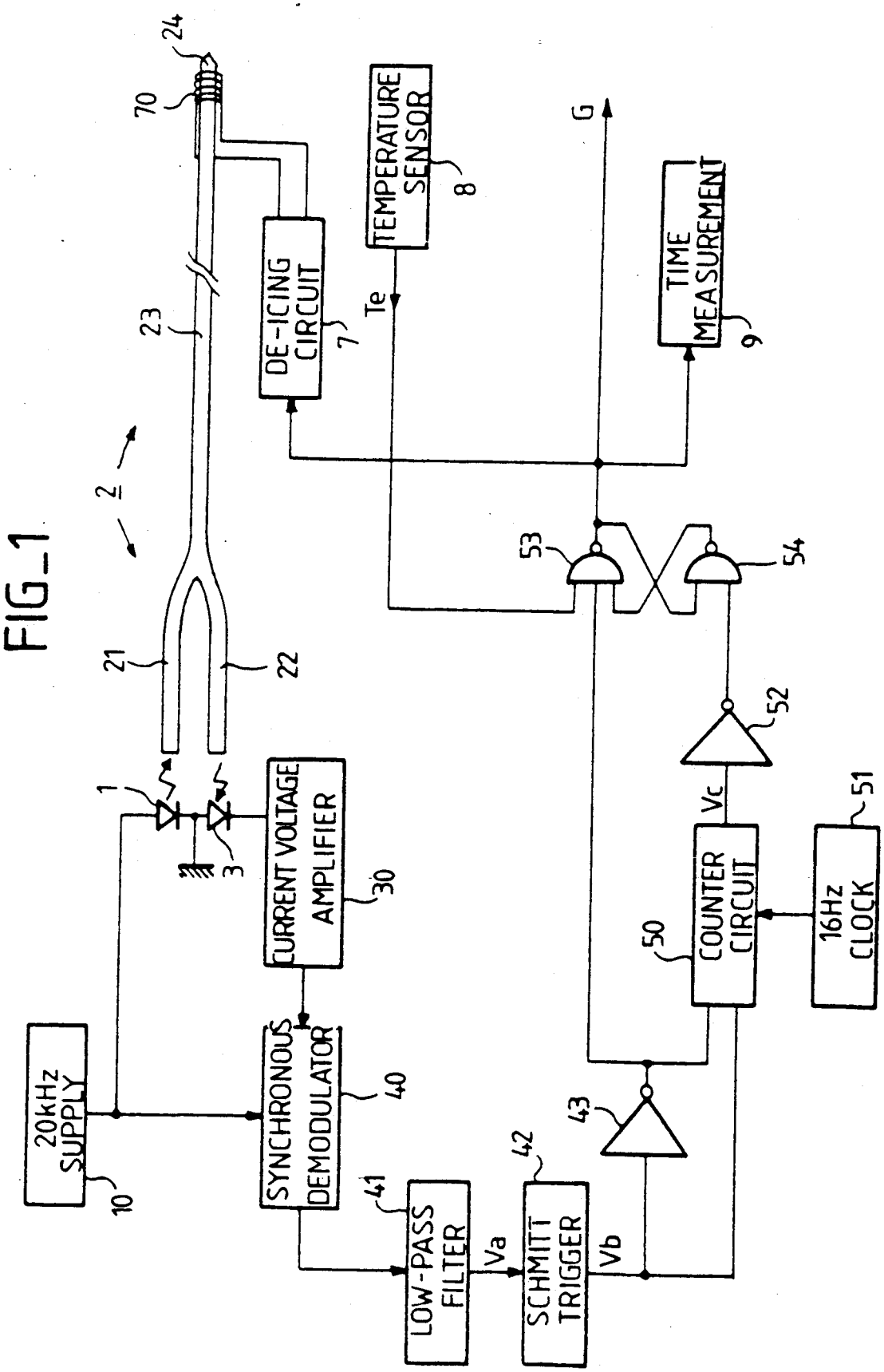

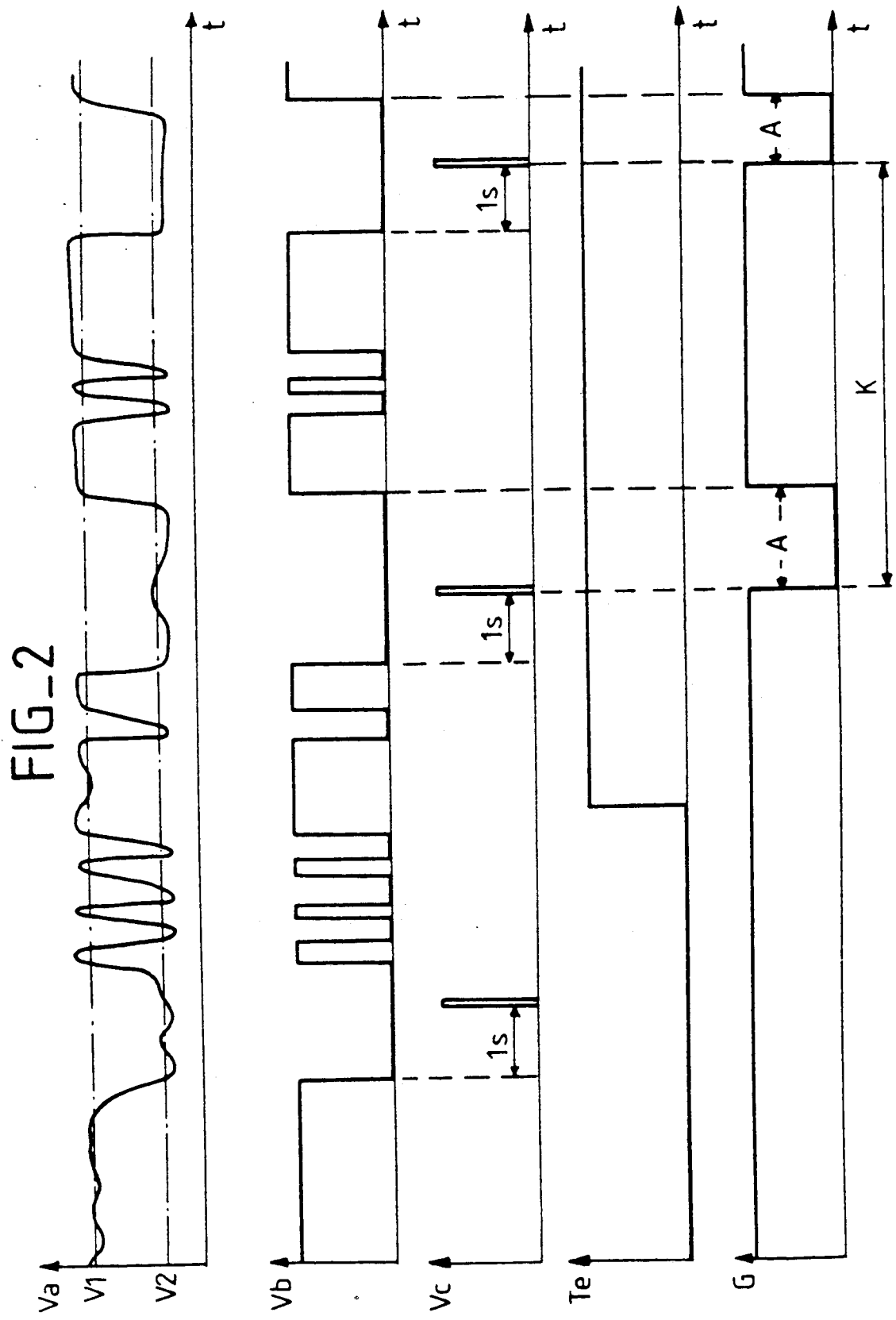

FIG_3
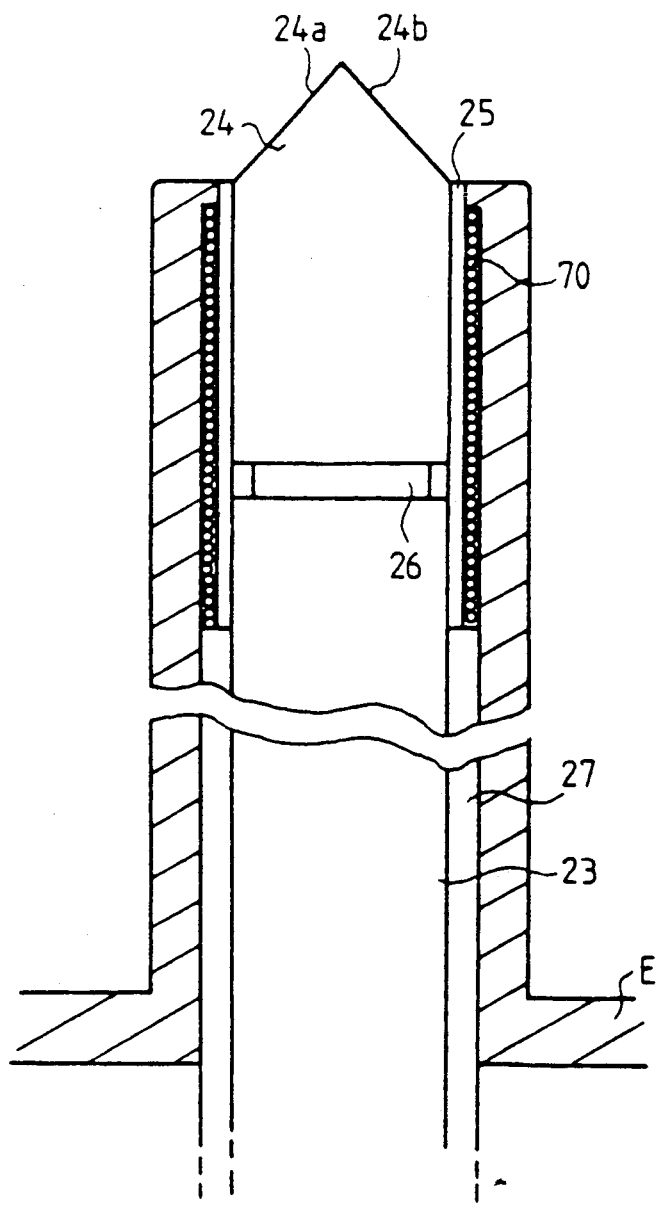

ICE DETECTOR, ESPECIALLY FOR AIRCRAFT

BACKGROUND OF THE INVENTION

1. Field of the Invention

The present invention pertains to ice detectors that can be used particularly in aircraft.

2. Description of the Prior Art

There are detectors such as this that, in fact, use simple optical level detectors of the kind existing in the walls of certain containers. The detector has an optical channel that connects a light source to a receiver. A part of the wall of the optical channel forms an interface with the external environment. For a container, the environment external to the optical channel is the interior of the container. For ice detectors, the external environment is the one in which the vehicle is moving. In these detectors, the light from the source reaches the interface and, depending on the refractive index of the external environment, it is either reflected towards the receiver or refracted, at least partially, towards the external environment. It is reflected when the external environment consists of air and it refracted when there is ice or a liquid. The receiver thus receives varying amounts of light, and a comparison circuit compares the output signal from the receiver with a reference signal and triggers an ice alarm signal or a signal that a level has been reached when the comparison shows that the output signal from the receiver is below the reference value, namely, that refraction has occurred. The alarm signal thus obtained is an unreliable indication for the detection of ice. For, it is practically impossible to distinguish between rain and ice in this way because the refractive indices of water in the liquid state and of ice are very close to each other, and experience shows that a thin film of rain has the same effect as a layer of ice, irrespectively of its thickness.

The present invention is aimed at preventing or, at least, at reducing the above-mentioned drawbacks.

This goal has been achieved after observation of the phenomenon of the flow of rainwater on a wall of a moving vehicle. When the speed is sufficient for the air to sweep the wall at the place where the observation is made, the rainwater does not flow uniformly but in successive droplets or wavelets. This causes a modulation of the light received by the receiver and, hence, of the signal delivered by the receiver. Now, such a phenomenon cannot take place with ice because, even when it is not deposited homogeneously, ice practically does not flow on the wall of the vehicle.

SUMMARY OF THE INVENTION

The present invention proposes an ice detector wherein a search is made for this modulation in order to determine whether the disturbances in the light received by the receiver are due to rain or whether they are due to ice.

According to the present invention, there is provided a detector comprising a light source, an optical channel having a wall, a part of which forms an interface with an external environment, a receiver coupled to the source by the channel, a comparison circuit coupled to the receiver to receive a signal from it and to give, at an output, a logic signal having levels 1 and 0 which respectively correspond to values of the signal, that it receives, greater than a first reference value and smaller than a second reference value, and, in order to be capable of working as an ice detector, a detection circuit coupled to the output of the comparison circuit to determine whether the logic signal has had a level 0 for at least a period of time of a pre-determined value and to give a detection signal.

BRIEF DESCRIPTION OF THE DRAWINGS

The present invention will be understood more clearly, and other characteristics will appear from the following description, and the figures pertaining thereto. Of these figures:

FIG. 1 shows a diagram of a detector according to the invention;

FIG. 2 shows timing diagrams relating to the different signals of the detector according to FIG. 1.

FIG. 3 shows a more detailed view of one of the elements of FIG. 1.

In the different figures, the corresponding elements are designated by the same references.

MORE DETAILED DESCRIPTION

FIG. 1 shows an ice detector with a light source formed by an electroluminescent diode 1, with its supply formed by a generator of 20 kHz rectangular wave signals. The diode is one that works in the infrared range, in the 880-900 nm band. A part of the light emitted by the diode 1 is directed by an optical channel 2 towards a photodiode 3 and the assembly is done so that the photodiode 3 receives light emitted by the diode 1 solely by the optical channel 2. This optical channel has a bundle formed by optic fibers which are equally divided, in the vicinity of the diodes 2, 3, into an emitting bundle 21 and a receiving bundle 22, the two halves being reunited into a single bundle 23 which reaches a prism 24. The bundle 21 directs the light from the bundle 21 towards the bundle 23 which directs it towards the prism 24. The prism 24, which can be seen more clearly in FIG. 3, is bonded by means of an optic bonder 26 to the end of the bundle 23. It has two plane faces 24a, 24b at 90 degrees to each other, forming an interface with the external environment which, in the example described, is the environment in which there is an aircraft on which the ice detector is mounted. The bundle 23 has a twofold role: through a part of its fibers, it conveys the light coming from the diode 1 towards the face 24a of the prism 24 and, through another part of its fibers, it conveys the light coming from the face 24b of the prism towards the bundle 22 which conveys it towards the photodiode 3. The light that reaches the face 24a, with a mean angle of incidence of 45 degrees, is either reflected towards the face 24b, if the external environment at the face 24a consists of air, or refracted towards the external environment if the external environment, at the face 24a, consists of water or ice, the refractive index of which is about 1.3. The result thereof is a reduction, or even an elimination, of the light transmitted to the photodiode 3. In the exemplary embodiment used for the description, the prism is placed at a distance of 7 cm. from the wall of the fuselage in the vicinity of the nose of the aircraft. It is thus intensely swept by air when the aircraft is in flight, but is sheltered from the so-called boundary layer disturbances, namely disturbances of the flow of air which appear in the immediate vicinity of the fuselage. A position of the prism such as this means that, whereas ice gets deposited on the faces 24a, 24b of the prism 24, rain on the other hand only slides on its faces, like raindrops on a window pane. The result thereof is that, when the rain strikes the faces 24a, 24b of the prism 24, there is a low-frequency modulation of the quantity of light transmitted to the photodiode 3 whereas with the appearance of ice, this modulation does not occur. There is permanent refraction and, hence, loss of a large quantity of light for the photodiode 3.

The output signal from the photodiode 3 is amplified in a current-voltage amplifier 30 and then applied to a synchronous demodulator which receives the 20 kHz rectangular wave signal from the supply 10. The synchronous demodulator 40 is followed by a low-pass filter 41 with a cut-off frequency equal to 70 Hz in the example described. These two circuits give a signal that corresponds to the mean value of the signal from the amplifier 30 but is rid of the disturbances due to the stray light coming from the external environment. For, this stray light has an identical effect on the low and high levels of the rectangular waves of light coming from the diode 1 supplied by the 20 kHz rectangular wave signals from the supply 10, so much so that the synchronous demodulator, which multiplies the low and high levels of the 20 kHz rectangular wave signals by 1 and −1 respectively, gives the effects of the stray light a mean zero value and hence enables the removal of these effects by the filter 41. The signal Va thus obtained is shown, as a function of the time t, in FIG. 2.

The signal Va is applied to the input of a shaping circuit constituted by a Schmitt trigger, the threshold voltages V1 and V2 of which are indicated in the graph of the signal Va in FIG. 2. The output signal Vb of the Schmitt trigger is shown, as a function of the time t, in FIG. 2.

A modulo 16 counter circuit 50 gives a signal Vc formed by pulses that appear at every second as soon as the signal Vb has been at the level 0 for at least one second. This criterion for the triggering of pulses has been chosen as being one that represents the appearance of ice on the prism 24 given that, under the conditions of use of the detector as considered during the experimentation, it turned out that the signal Vb, in the event of rain, remained at zero only for periods of time that were far shorter than one second. To give these pulses, the module 16 counter circuit counts at the rate of a 16 Hz clock circuit 51 during the levels 0 of the signal Vb, namely during the levels 1 of the signals Vb inverted by an inverter 43, and is reset by the levels 1 of the signal Vb. The pulses from the signal Vc, given by the circuit 50, are shown in FIG. 2.

The signal Vc, after inversion in an inverter 52, is applied to the second input of an AND gate with output inverter 54 which, with another AND gate with output inverter 53, forms a flip-flop circuit. In this flip-flop circuit, the first input of the gate 54 is connected to the output of the gate 53, and the three inputs of the gate 53 respectively receive the signal Vb inverted by the inverter 43, the output signal from the gate 54 and the signal Te given by a temperature sensor 8, located in the vicinity of the prism 24. The signal Te is designed to prevent untimely ice alarms from being triggered when the external temperature goes beyond a critical value above which ice cannot be formed. In the example described, the sensor 8 has been set to give a level 1 signal when the external temperature is below +1° C.

The flip-flop circuit 53, 54 gives a signal G at level 1 for as long as ice is not detected. If not, it gives a signal G at level 0. The signal G is shown, as a function of the time, in FIG. 2 and the time intervals corresponding to an ice detection alarm have been marked A in this figure. As shown, the flip-flop circuit 53, 54 makes the signal G go to the level 0 when the following conditions occur together:

the signal Te is at the logic level 1;
the signal Vb is at the logic level 0;
and a pulse of the signal Vc has made the output of the AND gate with inverter 54 go to 1.

After a passage to 0, the signal G can no longer return to the value 1 unless the external temperature goes above the critical value (signal at logic level 0) or the signal Vb goes to the logic level 1.

The signal G thus obtained not only acts as an ice alarm signal, but is also used to trigger a de-icing circuit 7 and to bring about a measurement of time between successive icings by a time-measuring circuit 9.

The de-icing circuit, which works for as long as the signal G is at the level 0, that is, for as long as the presence of ice has been detected, supplies a coil 70 of resistive wire surrounding the prism 24 and the end of the bundle 23. This coil provides for efficient de-icing of the prism 24 which is quickly rid of its layer of ice. As soon as the prism 24 has been rid of the ice that covers it, the signal G goes back to 1, the de-icing circuit 7 is stopped and it is again possible for ice to be formed on the faces of the prism 24. The time-measuring circuit 9, which is triggered by the descending edges of the signal G, measures the value of the time interval K between two successive detections of the ice alarm. This time interval indicates the severity of the icing.

FIG. 3, already referred to above, is a sectional view of the optical channel 2 of FIG. 1 in the part where the bundle 23 goes through the fuselage E of the aircraft. The bundle 23 has a 5 mm diameter and is surrounded by a sleeve 27. The end of the bundle is bonded, as already indicated, to one side of the prism, the other side of which has the faces 24a, 24b. A bushing 25 surrounds the prism 24 and the end of the bundle 23. It is surrounded by the coil 70 which supplies the de-icing circuit 7. The assembly is shielded by a tubular metal sheath which lets the faces 24a, 24b appear and is fixedly joined to the fuselage of the aircraft.

It must be noted that the bushing 25 is made of a magnetic alloy having a Curie point at 230° C. and that the coil 70 has a 115 V, 400 Hz supply. this enables the combination of heating by Joule effect in the coil 70 and by induction in the bushing 25, with a limiting of the heating temperature. For, above 230° C., the magnetic permeability of the bushing drops very sharply and the simple control of the current consumed enables the temperature of the bushing to be limited to about 250° C. without its being necessary, for this purpose, to measure its temperature.

It must be noted that the high temperature to which the prism is taken enables, in addition to fast de-icing, a cleaning of the impurities that could have settled on the faces of the prism.

The invention is not limited to the example described. It is thus that the optical channel 2 can be formed only by an optic fiber with the diodes 1 and 3 respectively placed at its two ends. The light is transmitted so a to be propagated by successive reflections on the walls of the fiber, and the path passes by a place where the fiber is rid of its protective sheath and is in contact with the external environment. If, at this place, the external environment consists of air, the light continues on its path by successive reflections. If the external environment consists of water or ice, at least a part of the light coming from the diode 1 is lost by refraction towards the external environment. It is then enough to distinguish between water and ice by the presence or absence of modulation in the signal coming from the photodiode 3. It is also possible to design an ice detector in which the optical channel has an interface formed by the tapered end of a multimode optic fiber.

Similarly, the different functions fulfilled by the circuits according to FIG. 1 may be carried out by any other appropriate circuits. As for the de-icing circuit 7 along with the coil 70 and the time-measuring circuit 9, they can be eliminated but it will no longer be possible to assess the severity of the icing which is given by the measurement of the time between two occurrences of icing separated by a heating. It is also possible to make an ice detector according to the invention without the temperature sensor 8.

Furthermore, the Schmitt trigger 42 can be replaced by a shaping circuit that has only one threshold, namely a circuit for comparison with only one value. This amounts to giving one and the same value V to the voltages V1, V2, shown in FIG. 2. The voltage Vb will then assume the value 1 when Va is greater than V and the value 0 when Va is smaller than V.

The invention can generally be applied to the detection of the formation of ice on a wall, inasmuch as the rain that strikes the interface of the optical channel will be removed as and when it arrives.

What is claimed is:

1. A detector comprising a light source, an optical channel having a wall, a part of which forms an interface with an external environment, a receiver coupled to the source by the channel, a comparison circuit coupled to the receiver to receive a signal from it and to give, at an output, a logic signal having levels 1 and 0 which respectively correspond to values of the signal, that it receives, greater than a first reference value and smaller than a second reference value, and, in order to be capable of working as an ice detector, a detection circuit coupled to the output of the comparison circuit to determine whether the logic signal has had a level 0 for at least a period of time of a pre-determined value and to give a detection signal.

2. A detector according to claim 1, comprising de-icing means to de-ice the optical channel at the interface, and wherein the de-icing means are controlled by the detection signal.

3. A detector according to claim 2, comprising a time-measuring circuit to measure the time that has elapsed between the start of two successive de-icing commands from the de-icing means.

4. A detector according to any one of the preceding claims, comprising a temperature sensor to measure the temperature of the external environment and make the taking into account of the detection signal dependent on the value of the temperature measured.

* * * * *